United States Patent [19]
Walkowski

[11] Patent Number: 5,187,202
[45] Date of Patent: Feb. 16, 1993

US005187202A

[54] CONCENTRATES FOR IMPARTING A SIMULATED STONE EFFECT TO THERMOPLASTIC SUBSTRATES

[75] Inventor: Timothy L. Walkowski, Bryan, Ohio

[73] Assignee: Ferro Corporation, Cleveland, Ohio

[21] Appl. No.: 761,002

[22] Filed: Sep. 17, 1991

[51] Int. Cl.$^5$ .................... C08L 1/00; B32B 23/02
[52] U.S. Cl. .................... 524/35; 428/389; 428/393; 427/206; 106/266; 106/272; 252/363.5
[58] Field of Search .......... 428/389, 393; 524/35; 427/206; 106/266, 272; 252/363.5

[56] References Cited

U.S. PATENT DOCUMENTS

| | | | |
|---|---|---|---|
| 4,107,135 | 8/1978 | Duggins et al. | 260/42.37 |
| 4,137,215 | 1/1979 | Van Gasse | 260/40 R |
| 4,235,948 | 11/1980 | Holmes | 428/15 |
| 4,240,936 | 12/1980 | Henning | 524/35 |
| 4,244,993 | 1/1981 | Platka, III et al. | 428/15 |
| 4,299,792 | 11/1981 | Nun | 264/328.18 |
| 4,446,177 | 5/1984 | Munoz et al. | 428/15 |
| 4,643,921 | 2/1987 | Terabe et al. | 428/15 |
| 4,680,155 | 7/1987 | Rochefort et al. | 264/73 |
| 4,734,302 | 3/1988 | Baskin | 428/15 |
| 4,756,951 | 7/1988 | Wang et al. | 428/204 |
| 4,791,020 | 12/1988 | Kokta | 428/393 |
| 4,849,456 | 7/1989 | Champion | 521/54 |
| 4,853,276 | 8/1989 | Kurushima | 428/187 |
| 4,863,782 | 9/1989 | Wang et al. | 428/204 |
| 4,871,596 | 10/1989 | Kamiya et al. | 428/15 |
| 4,877,656 | 10/1989 | Baskin | 428/15 |
| 4,891,399 | 1/1990 | Ohkawa et al. | 523/200 |
| 4,956,030 | 10/1990 | Baskin | 156/61 |
| 4,959,401 | 9/1990 | Bellasalma et al. | 523/466 |
| 5,008,306 | 4/1991 | Goguelin | 524/35 |

FOREIGN PATENT DOCUMENTS 3033441  2/1988  Japan ..................... 524/35

*Primary Examiner*—Paul R. Michl
*Assistant Examiner*—LaVonda R. DeWitt
*Attorney, Agent, or Firm*—Renner, Otto, Boisselle & Sklar

[57] ABSTRACT

The present invention provides a reproducible and aesthetically pleasing granite-like simulated stone appearance to a thermoplastic substrate by blending therewith a concentrate comprising: a cellulosic short fiber or flock; and at least one dispersant aid. Thus, the present invention also relates to a method for imparting a simulated stone appearance to a thermoplastic substrate and to simulated stone articles comprising a major amount of a substrate thermoplastic and a minor stone simulating amount of a cellulosic short fiber or flock.

18 Claims, No Drawings

CONCENTRATES FOR IMPARTING A SIMULATED STONE EFFECT TO THERMOPLASTIC SUBSTRATES

FIELD OF THE INVENTION

The present invention relates to the field of polymer additives. More particularly, the present invention relates to certain additive concentrates containing cellulosic fibers or flock; methods for imparting a simulated stone effect to thermoplastic substrates; and simulated stone articles and precolors produced according to such methods.

BACKGROUND OF THE INVENTION

Shaped articles having a simulated stone appearance and methods for producing such articles from filled polymeric resins are known. One principle form of simulated stone is prepared by blending a colorant and resin matrix to yield a random pattern of veining or striations giving an appearance similar to marble or onyx. This type of material is disclosed, for example, in U.S. Pat. Nos. 4,244,943 and 4,849,456.

A second principle form of simulated stone is prepared by blending colored particles in a resin matrix to yield a granular pattern which gives an appearance similar to granite or the like. In the preparation of artificial granite, it is important to employ a filler material having adequate heat stability and particle size. Moreover, it is essential that partial or full dispersion of the filler material and the resin substrate be achieved in order to provide a reproducible effect. Inadequate dispersion of the filler particles often results in particle agglomeration. This yields an unattractive blotchy or dappled appearance due to the streaking or smearing of the particle agglomerations within the resin matrix.

Prior to the present invention, granite-like simulated stone materials were prepared by dispersing filler particles in a substrate thermosetting resin. In the case of thermoset resins, the chemical reaction is only partially complete when the fillers are added, and is concluded when the resin is molded. This results in a non-meltable cross-linked resin article which cannot reworked. The advantage of using thermosetting resins is that the viscosity prior to cure is relatively low which facilitates the solubilization or random dispersion of the filler particles within the resin matrix.

U.S. Pat. No. 4,107,135 describes dappled articles which contain: (A) 20–70 parts by weight of a cross-linked polymer having a glass transition temperature of at least 70° C.; (B) 80–30 parts by weight of an inert filler; and (C) 0.01–2 percent by weight of the article, of short, colored fibers.

U.S. Pat. No. 4,137,215 describes a process for imparting a reproducible decorative effect in a molded plastic article comprising the steps of: (A) forming a molded composition by mixing (i) a curable thermosetting binder material, (ii) at least one inorganic filler, (iii) glass fiber and (iv) solid polymer particles in an amount from 0.1 to 20 percent by weight, based on said binder, said particles being a homopolymer or copolymer of styrene or of polyvinyl acetate; and (B) placing said composition in a mold and subjecting the same to elevated temperatures and pressures sufficient to (A) cure said thermosetting binder material, but (B) insufficient to effect more than partial solubilization of polymer particles in said binder material.

U.S. Pat. No. 4,235,948 describes a method of bonding a composition containing a catalyzed polyester bonding resin and a simulated stone aggregate to a preformed acrylic sheet. The simulated stone matrix composition comprises a catalyzed polyester bonding resin, a simulated stone aggregate, pigmenting agents and a selected exothermic reducing agent.

A disadvantage of the above procedures is their inapplicability to thermoplastic resin substrates. For thermoplastics, the polymerization reaction has been completed. Thus, the materials may be processed at or near their melting point, and scrap may be reground and remolded. This allows processing to be achieved by a wide variety of methods including extrusion, co-extrusion, thermo-forming, blow-molding, injection molding, compression molding, calendaring, laminating, stamping, pultrusion, etc.

There continues to be a need for a reproducible granite-like simulated stone effect in thermoplastics without problems such as heat stability and particle size of the filler, as well as smearing or streaking often caused by poor filler dispersion.

SUMMARY OF THE INVENTION

The present invention is based upon the discovery that a reproducible and aesthetically pleasing granite-like simulated stone appearance can be imparted to a thermoplastic substrate by blending therewith a concentrate comprising: a cellulosic short fiber or flock; and at least one dispersant aid. Thus, the present invention also relates to a method for imparting a simulated stone appearance to a thermoplastic substrate and to simulated stone articles comprising a major amount of a substrate thermoplastic and a minor stone simulating amount of a cellulosic short fiber or flock.

It is not certain whether any or all of the components interact chemically upon blending or processing. Therefore, the present invention contemplates compositions and articles comprising said components and any reaction product thereof, as well as other optional components and/or reaction products as described hereinafter.

DETAILED DESCRIPTION OF THE INVENTION

There is provided by the present invention, an additive effective to impart a simulated stone appearance to thermoplastics comprising:

(A) up to about 80 percent by weight of at least one carrier;

(B) at least about 50 percent by weight of a cellulosic short fiber or flock; and (C) up to about 10 percent by weight of at least one dispersant aid.

In one embodiment, the additives of the present invention are prepared as a dry color concentrate. In such concentrates, the carrier (A) is typically a mineral filler such as calcium carbonate, kaoline, feldspar, nepheline, silica, talc, mixtures of one or more thereof and the like. The dry color concentrates of the invention typically contain from zero up to about 50 percent by weight of a mineral filler as carrier (A), more often, from about 15 to about 30 percent by weight.

In another embodiment, the additives of the present invention are prepared as a pelletized concentrate. In the pelletized concentrate, the carrier (A) is a thermoplastic which is present in the concentrate in an amount of at least about 20 percent and up to about 80 percent by weight, more often, about 30 percent to about 60 percent by weight, and usually from about 45 percent to about 60 percent by weight. Included in the thermoplastic carriers (A) which can be employed in the simulated stone pelletized concentrates are, for example, polyolefins such as high density polyethylene (HDPE), low density polyethylene (LDPE), linear low density polyethylene (LLDPE), homo- and co-polymer polypropylenes, ethylene/vinyl acetate copolymer (EVA) and the like; styrene based materials such as crystal polystyrene, general purpose polystyrene (GPPS), medium impact polystyrene (MIPS), high impact polystyrene (HIPS) and the like; styrene-acrylonitrile copolymers (SAN); acrylonitrile-butadiene-styrene copolymers (ABS); polyamide resins (nylons); polyphenylene ethers (PPO); polycarbonates (PC); polyvinyl chloride (PVC), polyvinyl acetal based materials, polyethylene terephthalate (PET), polybutylene terephthalate (PBT) and the like, etc. Mixtures of one or more of such thermoplastics may also be employed as a carrier material.

The cellulosic short fiber or flock (B) employed in the additives of the present invention includes both natural or synthetic fibers based upon cellulose or a derivative thereof, as well as mixtures of one or more natural and/or synthetic fibers. The natural cellulose based fibers include, for example, fibers derived from bast or stem fibers (flax, jute, hemp, ramie), leaf fibers (sisal, abaca) and the seed and fruit fibers (cotton, kapok). Of the natural cellulosic based fibers, cotton is preferred.

A particularly suitable class of cellulosic short fiber or flock (B) useful in the practice of the present invention are those based upon synthetic derivatives of cellulose such as rayon. Such materials are based upon cellulose alkali metal xanthates, from which regenerated cellulose as viscose fibers (i.e., rayon), is produced. Such materials are described, for example, under the heading "Rayon" in *Kirk-Othmer Encyclopedia of Chemical Technology,* Third Edition, Volume 19, pages 855-880, Interscience Publishers, Division of John Wiley & Sons (1983) which is fully incorporated by reference herein; examples are: regular rayon fibers, high wet-modulus-type rayons (HWM), high performance (HP) rayons and the like, etc. Suitable rayon fibers are commercially available and may be obtained, for example, from Vertipile, Division of Claremont Flock Corp. (Leominster, Mass.).

The cellulosic short fibers or flock (B) are present in the concentrate in an amount of at least about 5 percent and up to about 30 percent by weight, more often, at least about 10 percent and up to about 20 percent by weight. In one embodiment, the cellulosic component (B) is present in the concentrate in an amount from about 15 percent to about 18 percent by weight.

The length of the cellulosic short fibers or flock (B) is normally in the range of about 10–500 mils (0.001"–0.5"), more often, about 10–125 mils (0.01"–0.125"). Normally, the short fibers (B) will have a denier of about 1–25, most often, about 1–5. Thus, when the term "short fiber or flock" is used in connection with component (B) throughout the application and in the appended claims it will be understood to include cellulosic fibers within the above-noted length and denier ranges.

The dispersant aid (C) is a material capable of adequately dispersing the cellulosic fibers (B) in the thermoplastic substrate. An effective amount of at least one dispersant aid is sufficient to: (1) reduce agglomeration of the cellulosic fibers and (2) reduce smearing or streaking of the fibers in the substrate. Usually, at least about 1 percent and up to about 10 percent by weight of at least one dispersant aid (C) is present in the concentrate. Included within suitable dispersant aids (C) are silicone fluids, glycerol plasticizers, epoxy plasticizers, metallic salts of fatty acids, waxes and mixtures of two or more of such dispersant aids.

Useful fluid silicones (C) are typically dimethyl polysiloxanes of the composition $[(CH_3)_2SiO]_x$, which are employed in an amount from zero up to about 5 percent by weight, more often, from about 1–2 percent by weight.

Useful epoxy plasticizers (C) are typically obtained by the epoxidation of vegetable oils or fatty acids such as epoxidized unsaturated triglycerides, e.g., soybean oil and linseed oil; and epoxidized esters of unsaturated fatty acids, e.g., oleic acid, or butyl-, octyl- or decyl esters. Of the epoxy plasticizers (C), epoxidized soybean oil (ESO) is preferred.

Included by the above-described glycerol plasticizers (C) are, for example, diacetin, glycerol ether acetate, glycerol monoacetate, glycerol mono-lactate triacetate, glycerol monolaurate, glycerol mono-oleate, glycerol monoricinoleate, glycerol phthalic anhydride, glycerol triacetate, glycerol dibuterate, glycerol tripropenate and the like.

In one embodiment, the epoxy and glycerol plasticizers (C) are employed individually in amounts from zero up to about 5 percent, more often, from about 1–2 percent in the simulated stone concentrate.

Another suitable class of dispersant aids (C) are the metallic salts of fatty acids. Such materials include, for example, zinc stearate, zinc palmitate, aluminum distearate, aluminum tristearate, aluminum oleate, aluminum palmitate, barium stearate, calcium stearate and the like. These materials are generally employed in the concentrate in amounts from zero up to about 5 percent by weight and, more often, from about 1–2 percent by weight.

A particularly suitable class of dispersant acids (C) are waxes. The waxes (C) useful in the concentrate include, for example, vegetable waxes such as castor wax, carnauba wax, candelilla wax and the like; and synthetic waxes such as amide waxes including ethylene-bis-stearamide (EBS); and the like, etc. When a wax is employed as the sole dispersant aid (C), the additive concentrates of the present invention will include at least about 5 percent by weight of at least one wax, and may include up to about 10 percent by weight of wax. Usually, the wax (C) is employed in an amount of at least about 5 percent and up to about 7 percent by weight. Such materials are effective to reduce and/or eliminate agglomeration of the cellulosic fibers (B), as well as streaking and/or smearing of such fibers in the substrate thermoplastic.

In one embodiment, the dispersant aid (C) is a single material employed in the amounts set forth above. In another embodiment, mixtures of two or more such materials may be used. In general, the dispersant aid (C) is employed in an amount sufficient to reduce and/or eliminate agglomeration of cellulosic component (B) in the substrate. Higher amounts than necessary to achieve this end can result in processing problems such as screw slippage and loss of mechanical shear. Those skilled in the art will be aware of such processing problems and will employ mixtures of dispersant materials in amounts to reduce fiber agglomeration without causing screw slippage or mechanical shear loss.

Suitable weight ratios for mixtures of various dispersant aids are, for example, 1:1 (wax:metallic salts of fatty acids), 2:1 (wax:plasticizers or polysiloxanes), and (plasticizers or polysiloxanes:metallic salts of fatty acids).

It is within the scope of the invention to optionally include in the simulated stone additive concentrate (D), one or more coupling agents compatible with each of the carrier (A), the cellulosic short fiber or flock (B), the dispersant aid (C), and the substrate thermoplastic. In general, concentrates of the present invention will optionally contain from 0 to about 2 percent by weight of a coupling agent (D), more often, from about 0.2–0.5 percent by weight.

Included by the above-described coupling agents (D) which can be employed in the concentrates are, for example, neoalkoxy zirconates such as neopentyl(diallyl)oxy, tri(dodecyl)benzenesulfonyl zirconate; neopentyl(diallyl)oxy, tri(dioctyl)phosphato zirconate; neopentyl(diallyl)oxy, tri(dioctyl)pyro-phosphate zirconate; neopentyl(diallyl)oxy, tri(N-ethylenediamino)ethyl zirconate and the like; cycloheteroatom titanates and zirconates such as cyclo[dineopentyl(diallyl)] pyrophosphate dineopentyl(diallyl) zirconate and the like; neoalkoxy titanates such as neopentyl(diallyl)oxy, tri(dodecyl)benzene-sulfonyl titanate; neopentyl(diallyl)oxy, tri(dioctyl)phosphato titanate; neopentyl(diallyl)oxy, tri(dioctyl)pyro-phosphato titanate; neopentyl(diallyl)oxy, tri(N-ethylenediamino)ethyl titanate and the like; etc.

It also is within the scope of the invention for the composition to optionally contain other conventional ingredients such as fillers, reinforcing materials, flame retardants, UV stabilizers, antioxidants, pigments, dyes, antistatic agents, mold release agents and the like.

In one embodiment, the additive concentrates of the present invention comprise: (A) at least about 20 percent by weight of at least one thermoplastic carrier; (B) at least about 5 percent by weight of a rayon short fiber or flock; and (C) at least about 5 percent by weight of at least one wax.

The simulated stone additive concentrates including components (A), (B), (C) and, optionally, (D) and other optional additives can be prepared by techniques well-known to those skilled in the art. For example, a particularly useful procedure is to intimately mix the components and additives. "Intimate" mixing means that the mixture is prepared with sufficient mechanical shear and thermal energy to produce a dispersed phase which is finally divided and homogeneously dispersed in the continuous or principle phase. Those skilled in the art will be familiar with blending methods and apparatus capable of intimately blending such components. They are exemplified by conventional mixing equipment such as a high-speed mixer (Henschel), a mill, a Banbury mixer, a Brabender Torque Rheometer, etc. For example, the dry color additive concentrates can be prepared by intimately mixing the components in the form of granules and/or powder in a high shear mixer.

Other suitable mixing equipment includes disc-pack processors and various types of extrusion equipment. Illustrations of the latter are continuous mixers; single screw kneading extruders; counter-rotating, non-intermeshing twin screw extruders having screws which include forward-flighted compounders, cylindrical bushings and/or left-handed screw elements; corotating, intermeshing twin screw extruders; and extruders having screws which include one or more sections of kneading block elements. Depending on the type of extrusion equipment, one or more of blending, mixing and/or extrusion may be used on the same concentrate.

In one embodiment, the simulated stone pelletized concentrates of the present invention may be prepared by melt-blending at least about 20 percent and up to about 80 percent by weight of at least one thermoplastic carrier (A), at least about 5 percent and up to about 30 percent by weight of a cellulosic short fiber or flock (B), at least about 5 percent and up to about 10 percent of at least one wax (C), from 0 up to about 2 percent by weight of a coupling agent (D) and from 0 to about 40 percent by weight of optional additives and/or fillers. Typical melt blending temperatures are in the range of about 320°–550° F. The concentrates of the present invention are incorporated into thermoplastic resin substrates in an amount sufficient to impart a simulated stone appearance to shaped articles prepared from such substrates. In general, such articles comprise a major amount of a substrate thermoplastic and a minor stone simulating amount of a cellulosic short fiber or flock (B), most often, rayon.

Generally, the concentrate is used at a level to introduce from at least about 0.01 percent and up to about 5.0 percent of the cellulosic short fiber or flock (B) into the thermoplastic substrate and, more often, at a level to introduce about 0.2 percent to about 1.0 percent of the cellulosic short fiber or flock (B) into the substrate.

Usually, the substrate will contain from about 0.4 percent to about 0.7 percent rayon fiber. The thermoplastic substrates treated with the concentrates of the present invention can be processed into shaped articles by extrusion, co-extrusion, thermo-forming, blow-molding, injection-molding, compression-molding, calendaring, laminating, stamping, pultrusion, etc. The thermoplastic substrates which are contemplated are, generally, any thermoplastic capable of being modified by the additive concentrates of the present invention. More specifically, the thermoplastics listed above as being useful thermoplastic carriers (A) also are particularly suitable thermoplastic substrates for use in the practice of the present invention.

In one embodiment, simulated stone thermoplastic substrates can be employed as precolors to modify other substrate materials. The precolor will typically contain from about 90 percent to about 99.9 percent substrate thermoplastic with the balance being cellulosic fiber (B) and other optional additives as mentioned above.

In order that those skilled in the art will be better able to practice the invention, the following examples are given by way of illustration and not by way of limitation.

EXAMPLES 1–5

In the following examples, the rayon fibers employed are synthetic rayon fibers (0.03" length, 3 denier material) obtained from Vertipile (Leominater, Mass.). The colorants are listed according to their C.I. numbers as set forth in *Colour Index*, 3rd. ed., vol. 3, (1971) published by Lund Humphries (London).

Each of the components are placed in a high-speed mixer (Henschel) and blended for about two 1.5 minute cycles. These mixtures were then extruded on a Wayne single screw extruder (without screen packs). The details for each extrusion are set forth below.

EXAMPLE 1

The following mixture is extruded at approx. 390°–420° F. into solid pellets:

| Component | Weight % |
| --- | --- |
| Pigment white 6 | 20.00 |
| Pigment black 11 | 0.10 |
| EBS wax | 5.0 |
| Rayon fiber | 17.50 |
| GPPS | 46.90 |
| SB copolymer (styrene 840A) | 10.00 |
| Coupling agent[1] | 0.25 |
| Coupling agent[2] | 0.25 |

[1]Neopentyl(diallyl)oxy, tri(dodecyl)benzenesulfonyl titanate
[2]Cyclo[dineopentyl(diallyl)]pyrophosphato dineopentyl(diallyl) zirconate

EXAMPLE 2

The following mixture is extruded at 340°–375° F. into solid pellets:

| Component | Weight % |
| --- | --- |
| Pigment white 6 | 0.33 |
| Pigment black 11 | 0.45 |
| Pigment blue 29 | 0.16 |
| Pigment brown 11 | 20.00 |
| Rayon fiber | 16.50 |
| EBS wax | 5.00 |
| EVA | 57.56 |

EXAMPLE 3

The following mixture is extruded at 340°–375° F. into solid pellets:

| Component | Weight % |
| --- | --- |
| Pigment white 6 | 20.0 |
| EBS wax | 5.0 |
| Rayon fiber | 10.0 |
| LLDPE | 32.5 |
| LDPE | 32.5 |

EXAMPLE 4

The following mixture is extruded at 390°–400° F. into solid pellets:

| Component | Weight % |
| --- | --- |
| Pigment black 11 | 0.130 |
| Pigment blue 29 | 0.947 |
| Pigment yellow 80 | 0.023 |
| Pigment white 6 | 20.000 |
| FD&C No. 5 | 0.098 |
| Aluminum tristearate | 1.500 |
| EBS wax | 1.500 |
| H-30 Nylon (polyamide) | 60.302 |
| Coupling agent[1] | 0.500 |

[1]Neopentyl(diallyl)oxy, tri(N-ethylenediamino)ethyl titanate

EXAMPLE 5

A substrate thermoplastic polymer (LDPE) is blended with the pelletized concentrate of Example 3 as follows:

| Component | Weight % |
| --- | --- |
| LDPE | 96 |
| Concentrate of Example 3 | 4 |

The modified thermoplastic has an aesthetically pleasing granite-like simulated stone appearance and may be readily molded into shaped articles.

Although the above examples are limited to only a few of the variables applicable to the compositions and methods within the scope of the present invention, it should be understood that the scope of the present invention can be further appreciated by the description preceding these examples. Therefore, it is to be understood that the invention disclosed herein is intended to cover such modifications as fall within the scope of the appended claims.

What is claimed is:

1. An additive concentrate comprising:
   a cellulosic short fiber or floc having a length of about 10 to about 125 mils and fineness of about 1 to about 25 denier; and
   at least one dispersant aid selected from silicone fluids, glycerol plasticizers, epoxy plasticizers, metallic salts of fatty acids, waxes and mixtures of two or more thereof.

2. An additive concentrate comprising:
   (A) up to about 80 percent by weight of at least one carrier;
   (B) at least about 5 percent by weight of a cellulosic short fiber or floc having a length of about 10 to 125 mils and fineness of about 1 to about 25 denier; and
   (C) at least about 1 percent by weight of at least one dispersant aid selected from silicone fluids, glycerol plasticizers, epoxy plasticizers, metallic salts of fatty acids, waxes and mixtures of two or more thereof.

3. An additive concentrate according to claim 2 wherein the carrier (A) comprises at least one mineral filler which is present in an amount up to about 50 percent by weight.

4. An additive concentrate according to claim 2 wherein the carrier (A) comprises at least one thermoplastic which is present in an amount of at least about 20 percent by weight.

5. A polymer additive concentrate according to claim 2 wherein the cellulosic short fiber or floc (B) comprises at least one natural fiber.

6. An additive concentrate according to claim 2 wherein the cellulosic fiber or floc (B) comprises at least one synthetic fiber.

7. An additive concentrate according to claim 6 wherein said synthetic fiber comprises rayon.

8. An additive concentrate according to claim 2 wherein the dispersant aid (C) comprises at least about 5 percent by weight of at least one wax.

9. An additive concentrate according to claim 8 wherein the dispersant aid (C) comprises a vegetable wax, an amide wax or a mixture of two or more thereof.

10. An additive concentrate according to claim 9 wherein said dispersant aid (C) is an ethylene-bis-stearamide wax.

11. An additive concentrate according to claim 2 where there is also present (D), up to about 2 percent by weight of at least one coupling agent.

12. An additive concentrate according to claim 11 wherein said coupling agent (D) is selected from neoalkoxy zirconates, cycloheteroatom zirconates, neoalkoxy titanates, cycloheteroatom titanates and mixtures of two or more thereof.

13. An additive concentrate for imparting a simulated stone effect to a thermoplastic substrate which comprises:
(A) at least about 20 percent by weight of at least one thermoplastic carrier;
(B) at least about 5 percent by weight of a rayon short fiber or floc having a length of about 10 to about 125 mils and fineness of about 1 to about 25 denier; and
(C) at least about 5 percent by weight of at least one wax selected from silicone fluids, glycerol plasticizers, epoxy plasticizers, metallic salts of fatty acids, waxes and mixtures of two or more thereof.

14. A method for imparting a simulated stone appearance to a thermoplastic resin which comprises, incorporating in said resin an effective amount of a concentrate according to claim 1.

15. A method of imparting a simulated stone appearance to a thermoplastic resin which comprises, incorporating in said resin an effective amount of an additive concentrate comprising:
(A) at least about 20 percent by weight of at least one thermoplastic carrier;
(B) at least about 5 percent by weight of a rayon short fiber or floc having a length of about 10 to 125 mils and fineness of about 1 to about 25 denier; and
(C) at least about 5 percent by weight of at least one wax selected from silicone fluids, glycerol plasticizers, epoxy plasticizers, metallic salts of fatty acids, waxes and mixtures of two or more thereof.

16. A simulated stone article comprising a major amount of a thermoplastic resin substrate and a minor stone simulating amount of the concentrate according to claim 1.

17. A simulated stone article comprising a major amount of a thermoplastic resin substrate and a minor stone simulating amount of the concentrate according to claim 2.

18. A simulated stone article comprising a major amount of a thermoplastic substrate and a minor stone simulating amount of the concentrate according to claim 13.

* * * * *